UNITED STATES PATENT OFFICE.

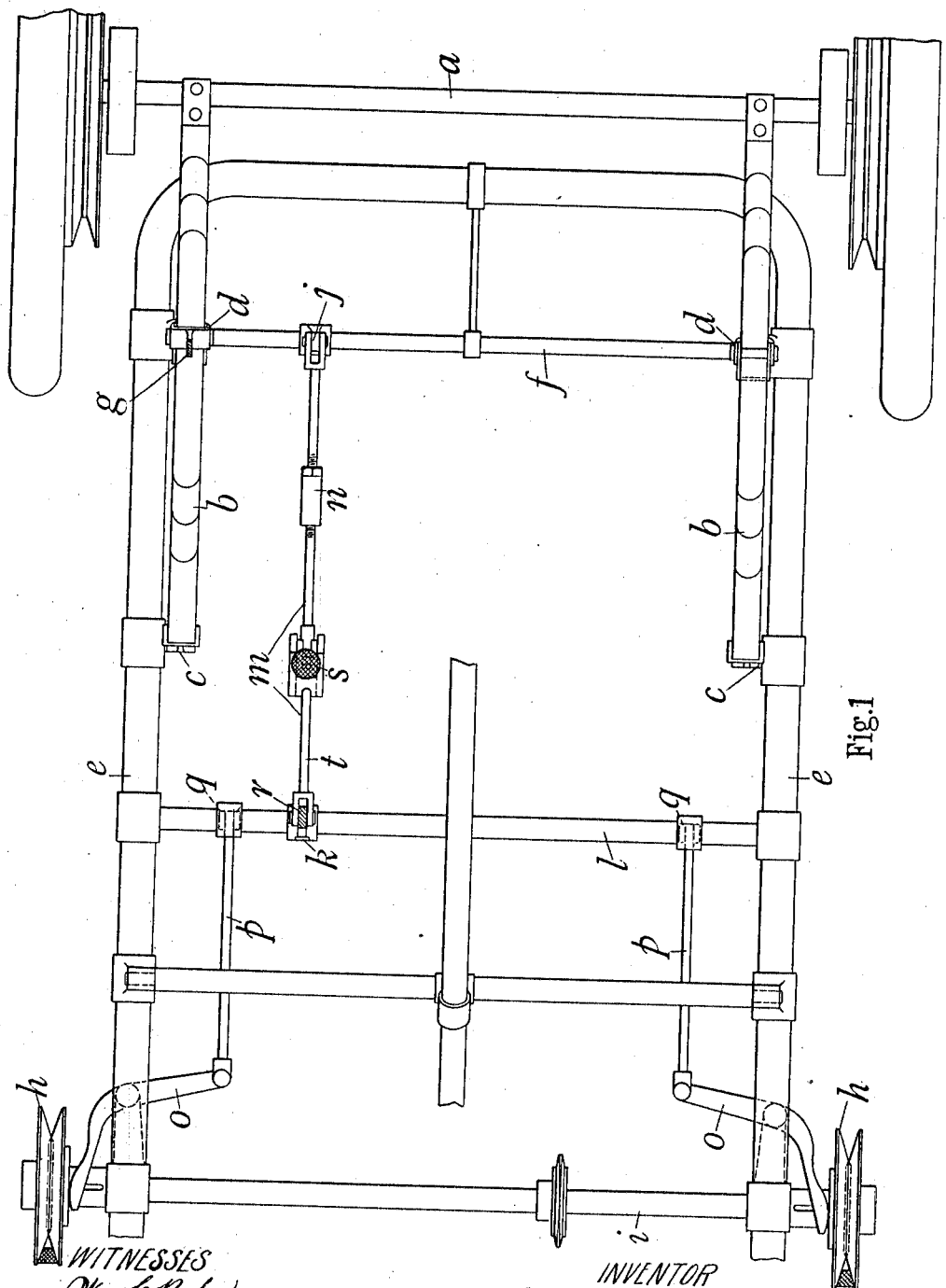

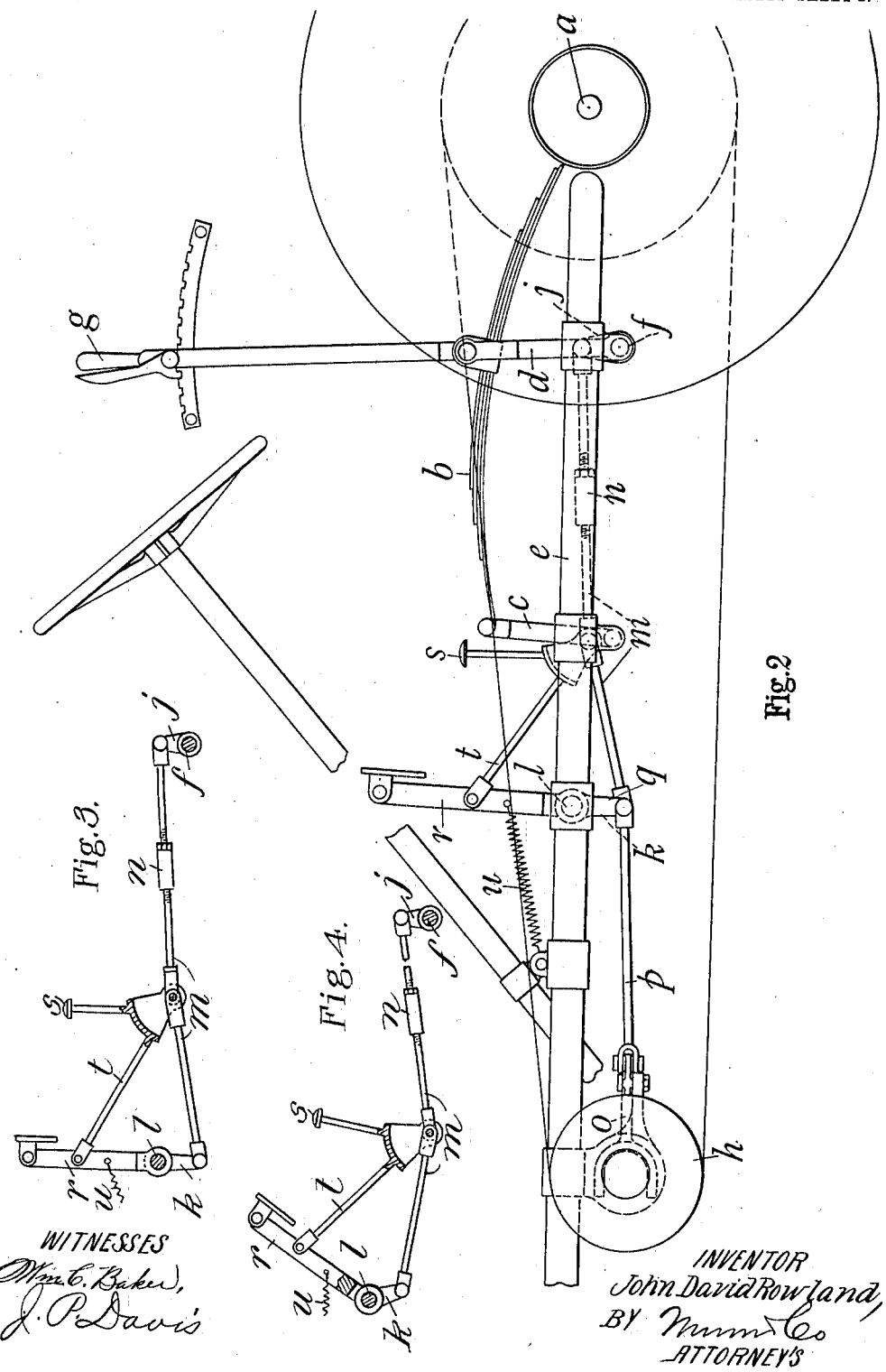

JOHN DAVID ROWLAND, OF BIRMINGHAM, ENGLAND.

DRIVING MECHANISM FOR MOTOR-VEHICLES.

1,059,216.  Specification of Letters Patent.  Patented Apr. 15, 1913.

Application filed September 17, 1912. Serial No. 720,727.

*To all whom it may concern:*

Be it known that I, JOHN DAVID ROWLAND, subject of the King of Great Britain, director of Warne, Wright & Rowland Limited, of 56–59 Watery Lane, in the city of Birmingham, England, have invented certain new and useful Improvements Relating to Driving Mechanism for Motor Road-Vehicles, of which the following is a specification.

This invention relates to driving mechanism for, more especially, four wheel motor road vehicles of the belt or chain driven type, and has for its object to provide improved means for controlling such mechanism.

It has been previously proposed to mount a pulley on a rear shaft or axle which is movable laterally or parallel to itself and connect such pulley to an expansible pulley on a countershaft which is driven by the engine. It has also been proposed to operate the expansible pulley for increasing or diminishing its effective diameter from the same lever or the like as imparts lateral movement to the rear axle. According to this invention the mechanism connected with the expansible pulley is adapted to permit operation of the said pulley independently of the rear axle as well as conjointly with the said axle.

Referring to the three accompanying sheets of explanatory drawings:—Figure 1 is a plan and Fig. 2 a side elevation of motor vehicle driving mechanism constructed in accordance with this invention. Figs. 3 and 4 illustrate a portion of the controlling mechanism in two different positions.

The same reference letters in the different views indicate the same parts.

In carrying the invention into effect as shown, the rear axle $a$ is carried on the ends of a pair of laminated springs $b$. Each spring is supported on a pair of parallel links $c$ and $d$ one of which is pivoted to the frame or chassis $e$ of the vehicle and the other secured to a rotatable cross bar $f$. One of the links has an operating handle $g$ connected thereto. By means of the handle the springs can be moved horizontally and the axle $a$ thereby moved laterally or parallel to itself. The expansible pulley or pulleys $h$, which may be of any convenient and known type and are preferably telescopic, are mounted on the countershaft $i$. One part of each pulley is fixed on the shaft while the other is feather-keyed and movable axially thereon. Operation of the movable portion is effected by a link and lever system connected to the cross bar $f$ aforesaid, so that with adjustment of the position of the rear axle the effective diameter of the pulleys is also adjusted. The expansible pulleys and pulleys on the rear axle are connected by belts or chains. At the base of the groove in each expansible pulley a loose ring may be provided on which the belt or chain can run idly when the parts of the pulley are fully separated. By the above mechanism constant tension is maintained on the belt at all speeds.

To enable the parts of the expansible pulleys to be operated without affecting the position of the back axle and thereby allow the belts to be sufficiently slackened for the pulleys to run idly the following mechanism is employed. To the pivoted or rotatable cross bar $f$ is secured a lever $j$, and this is connected to a lever $k$ on a second pivoted or rotatable cross bar $l$ by a two-part or toggle link $m$ one of the members of which may be constructed in two parts united by a screw coupling $n$ for adjustment purposes. The cross bar $l$ is connected to the pulley operating levers $o$ by links $p$ and levers $q$. On the said bar is also freely mounted a pedal lever $r$. The latter is forked at its lower end and made to embrace the bar $l$ on each side of the lever $k$. At the junction of the two parts of the toggle link $m$ a foot operated pressure piece $s$ is hinged and this is connected to the pedal lever $r$ by a link $t$. The parts $r$ and $s$ form virtually one piece adapted to be actuated by the toe or heel of the driver respectively. With the parts of the link in the position shown in Fig. 3 operation of the back axle by the hand lever $g$ simultaneously actuates the pulley levers $o$, causing the pulleys to be expanded or contracted as the back axle is moved toward or away from the rear of the chassis. On applying pressure by means of the heel on the piece $s$, the parts of the link $m$ are caused to take up the position shown in Fig. 4. This imparts a rearward movement to the levers $q$, and consequently enables the parts of the pulleys $h$ to separate and thereby slacken the belt without affecting the position of the back axle. Disconnection of the engine without stopping the same is therefore immediately effected by depressing the piece $s$.

To restore the parts of the pulleys and the tension of the belts to their original condition the pedal lever *r* is actuated by the toe of the driver, the piece *s* and link *m* being thereby caused through the link *t* to return to the position shown in Fig. 3. Adjustment of the belt to take up slackness due to wear is effected by the screw coupling *n*. The adjacent ends of the parts of the link *m* forming the toggle joint are suitably shaped in any ordinary manner to interengage or coöperate for limiting the relative movement of the parts to any convenient range such as that shown in Figs. 3 and 4.

It may often be more convenient to slacken the belt before adjustment of the pulleys is effected and the back axle moved parallel to itself. This is equivalent to unclutching the engine of a motor car before changing the speed gears. A spring *u* serves to prevent accidental moving of the toggle joint from the Fig. 3 to the Fig. 4 position.

Mechanism as herein described is extremely simple and enables all the required control over the driving mechanism to be obtained in a very convenient manner.

The invention is not limited to four wheel vehicles as it may be also applied to three wheel vehicles. Neither is it limited to the particular operating mechanism described.

Having thus described my invention what I claim as new and desire to secure by Letters Patent is:—

1. In driving mechanism for motor road vehicles, the combination with an expansible driving pulley, a laterally movable rear axle, a driven pulley on the axle and a transmission member connecting said pulleys, of actuating means for said axle and expansible pulley, a jointed link interposed in said actuating means, and a pedal whereby the jointed link can be operated for permitting the expansible pulley to be actuated independently of the axle, substantially as described.

2. In driving mechanism for motor road vehicles, the combination with an expansible driving pulley and controlling mechanism therefor, a laterally movable rear axle, a driven pulley on the axle, and a transmission member connecting said pulleys, of a hand lever, means connecting said lever to the rear axle and means consisting in part of a jointed link connecting the same lever to the controlling mechanism of the expansible pulley, and a pair of pedals connected together and respectively adapted to deflect and restore the parts of the jointed link to permit operation of the expansible pulley independently of the rear axle, substantially as described.

3. In driving mechanism for motor road vehicles, the combination with an expansible driving pulley, a laterally movable rear axle, a driven pulley on said axle, and a flexible transmission member connecting said pulleys, of a hand lever, means in conjunction with said lever for actuating the rear axle, an operating lever in conjunction with the expansible pulley, a cross shaft, a link connecting said pulley operating lever to the cross shaft, a jointed link connecting said link to the said hand lever, a pedal lever pivoted on said cross shaft, and a pedal attached to junction of parts of jointed link and connected to pedal lever, substantially as described.

4. In driving mechanism for motor road vehicles, the combination with an expansible driving pulley, a laterally movable rear axle, a driven pulley on said axle, and a belt connecting said pulleys, of springs carrying the rear axle, hinged links supporting the said springs, a hand lever connected to one of said links, a cross shaft connected to said links and a lever thereon, an operating lever for the expansible pulley, a second cross shaft and levers on said second shaft, a link connecting the pulley actuating lever to one of the levers on the second cross shaft, a jointed link connecting another of the levers on second cross shaft to the lever on the first mentioned cross shaft, a pedal lever pivoted on second cross shaft, a pedal attached to junction of members of jointed link and the said pedal lever, and a spring attached to the pedal lever, substantially as described.

In testimony whereof I have signed my name to this specification in the presence of two subscribing witnesses.

JOHN DAVID ROWLAND.

Witnesses:
JOHN MORGAN,
EDWARD TILL.

---

Copies of this patent may be obtained for five cents each, by addressing the "Commissioner of Patents, Washington, D. C."